US010546051B2

(12) United States Patent
Roberts et al.

(10) Patent No.: US 10,546,051 B2
(45) Date of Patent: Jan. 28, 2020

(54) ANNOTATION OF IMAGES BASED ON A 3D MODEL OF OBJECTS

(71) Applicant: Lawrence Livermore National Security, LLC, Livermore, CA (US)

(72) Inventors: Randy S. Roberts, Livermore, CA (US); John Goforth, Carlsbad, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/974,538

(22) Filed: May 8, 2018

(65) Prior Publication Data

US 2018/0260992 A1 Sep. 13, 2018

Related U.S. Application Data

(63) Continuation of application No. 15/238,550, filed on Aug. 16, 2016, now Pat. No. 10,019,824.

(51) Int. Cl.
*G06F 17/24* (2006.01)
*G06T 17/05* (2011.01)
*G06T 3/00* (2006.01)

(52) U.S. Cl.
CPC .......... *G06F 17/241* (2013.01); *G06T 3/0068* (2013.01); *G06T 17/05* (2013.01)

(58) Field of Classification Search
CPC ....... G06F 17/241; G06T 17/05; G06T 19/00; G06T 2219/004; G06T 3/0068
See application file for complete search history.

(56) References Cited

U.S. PATENT DOCUMENTS

| 8,462,176 | B1 | 6/2013 | Stubbs | |
|---|---|---|---|---|
| 9,953,438 | B2 * | 4/2018 | Sbaiz | H04N 1/00323 |
| 2004/0145594 | A1 * | 7/2004 | Kobayashi | G06T 15/20 |
| | | | | 345/633 |
| 2006/0170693 | A1 * | 8/2006 | Bethune | G06T 3/40 |
| | | | | 345/568 |
| 2009/0179895 | A1 | 7/2009 | Zhu | |
| 2010/0085350 | A1 | 4/2010 | Mishra | |

(Continued)

OTHER PUBLICATIONS

Kaminsky, Ryan S., et al. "Alignment of 3D point clouds to overhead images," Computer Vision and Pattern Recognition Workshops, 2009, CVPR Workshops 2009, IEEE Computer Society Conference on IEEE, 2009.

(Continued)

*Primary Examiner* — Ryan M Gray
(74) *Attorney, Agent, or Firm* — Perkins Coie LLP

(57) ABSTRACT

An annotation system for providing annotations for original images is provided. In some embodiments, the annotation system accesses an annotation associated with an object of a 3D model. The annotation system also accesses and displays an original image. The annotation system renders a model image of the 3D model based on the view from which the original image was collected. When the model image contains the annotated object, the annotation system provides an indication that an annotation is associated with the object of the original image. The annotation system can provide indications of the annotation for other original images that include the annotated object irrespective of the view from which the other original images are collected.

29 Claims, 11 Drawing Sheets

(56) References Cited

U.S. PATENT DOCUMENTS

| | | | |
|---|---|---|---|
| 2010/0118025 A1 | 5/2010 | Smith | |
| 2010/0123737 A1 | 5/2010 | Williamson | |
| 2012/0169734 A1* | 7/2012 | Snavely | G06K 9/00637 |
| | | | 345/419 |
| 2013/0311868 A1* | 11/2013 | Monney | G06T 11/60 |
| | | | 715/230 |
| 2015/0268058 A1 | 9/2015 | Stubbs | |
| 2016/0267067 A1* | 9/2016 | Mays | G06F 16/00 |
| 2017/0069121 A1* | 3/2017 | Zhu | G06T 19/00 |
| 2017/0277670 A1 | 9/2017 | Smith | |

OTHER PUBLICATIONS

Baboud, Lionel, et al. "Automatic photo-to-terrain alignment for the annotation of mountain pictures," Computer Vision and Pattern Recognition (CVPR), 2011, IEEE Conference on IEEE, 2011.
TerraVision II: Visualizing Massive Terrain Databases in VRML.
Agarwal, Sameer, et al. "Reconstructing rome," Computer 43.6 (2010):40-47.
Frueh, Christian, Russell Sammon, and Avideh Zakhor, "Automated texture mapping of 3D city models with oblique aerial imagery," 3D Data Processing, Visualization and Transmission, 2004. 3DPVT 2004. Proceedings, 2nd International Symposium on. IEEE, 2004.
Tong, Xiaohua, Shijie Liu, and Qihao Weng, "Bias-corrected rational polynomial coefficients for high accuracy geo-positioning QuickBird stereo imagery," ISPRS Journal of Photogrammetry and Remote Sensing 65.2 (2010)218-226.

* cited by examiner

ANNOTATION OF IMAGES BASED ON A 3D MODEL OF OBJECTS

CROSS-REFERENCE TO RELATED APPLICATION

This application is a continuation of U.S. application Ser. No. 15/238,550, filed on Aug. 16, 2016, which is hereby incorporated by reference in its entirety.

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Electro-optical imaging satellites collect enormous amounts of geospatial imagery. As an example, the current DigitalGlobe constellation of satellites is capable of collecting over three million square kilometers of high-resolution geospatial imagery every day. Many other commercial providers collect similarly large amounts of geospatial imagery. The United States Government also collects geospatial imagery, although it provides the geospatial imagery to a very restricted customer base.

When geospatial imagery is provided, a satellite image is provided along with metadata that represents the ground-to-image geometry. The ground-to-image geometry allows a geospatial coordinate (e.g., latitude, longitude, and height) to be mapped to the corresponding pixel coordinate (e.g., row number and column number) of the satellite image. A Rational Polynomial Coefficient ("RPC") camera model is one type of such metadata. The RPC camera model is an approximation of a Rigorous Projection Model ("RP") model that describes the precise relationship between image coordinates and ground coordinates. (See "The Compendium of Controlled Extensions (CE) for the National Imagery Transmission Format (NITF)," v. 2.1, National Imagery and Mapping Agency, Nov. 16, 2001.) The RPC camera model provides 20 numerator coefficients and 20 denominator coefficients for a row equation and 20 numerator coefficients and 20 denominator coefficients for a column equation. The row equation inputs a geospatial coordinate and outputs the row number that contains the pixel of the image corresponding to that geospatial coordinate, and the column equation inputs a geospatial coordinate and outputs the column number that contains the pixel of the image corresponding to that geospatial coordinate. All the geospatial coordinates along a ray from the camera to a point on the surface of the earth map to the same pixel coordinate.

Although geospatial imagery is useful in its own right, it can be much more useful when annotations are applied to the geospatial imagery. For example, a person viewing a satellite image that includes San Francisco may notice that it contains a tower whose top looks somewhat like a firehose nozzle. If an annotation was associated with a portion of the image corresponding to the tower, the user could click on the tower to see the annotation. The annotation may provide the name of the tower (i.e., "Coit Tower") along with an explanation that the tower was not designed to look like a firehose nozzle. If annotations were associated with satellite images, then a wealth of information could be made available to those people viewing the satellite images.

Because it is difficult to automate the adding of annotations, the process of annotating geospatial imagery is typically performed manually by an image analyst, which is itself a difficult and time-consuming task. A significant problem with automatically annotating objects (e.g., Coit Tower) in geospatial imagery is that the satellite image is often collected by satellites from off-nadir (i.e., not looking straight down) viewpoints, sometimes with large obliquity. Such off-nadir viewing angles make segmentation, the first step in traditional annotation processing, much more difficult and error-prone. Additionally, shadows are difficult to process and can be mistaken by automated systems for objects in the satellite image. For example, the shadows cast by tall structures can appear to be objects themselves or may obscure actual objects. Unfortunately, the cost of manually annotating satellite images can be prohibitive, and the results often have errors. Thus, the vast majority of satellite imagery is never annotated.

DETAILED DESCRIPTION

Figure 1:
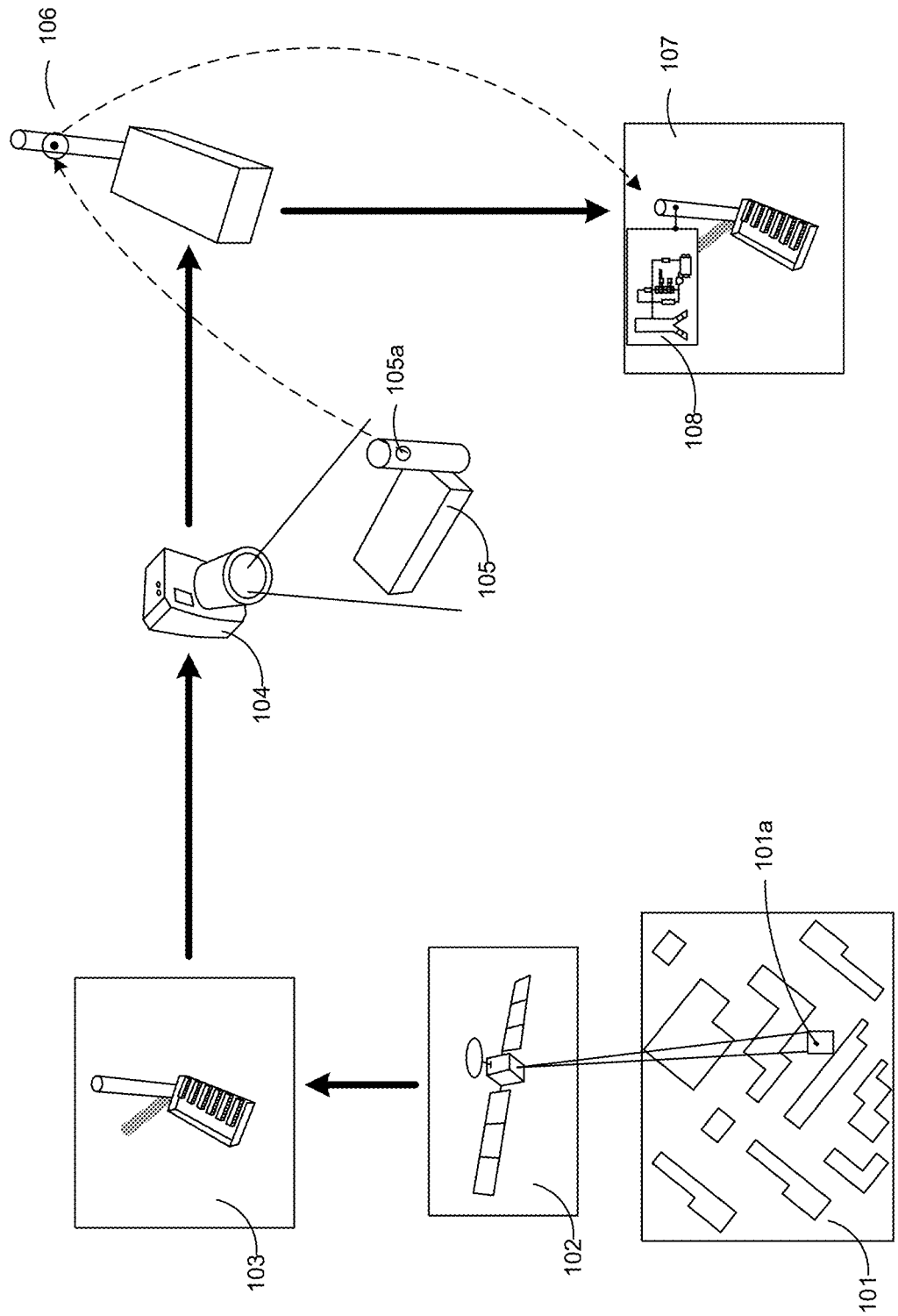
FIG. 1 is a diagram illustrating the overall processing for providing annotations based on a 3D model in some embodiments.

A method and system for annotating an original image (e.g., an image or portion of an image collected from a satellite or unmanned aerial vehicle) is provided. The annotation system allows a user viewing an original image to select an object of the original image and provide an annotation for that object. The annotation system associates the annotation with that object in a 3D model of objects that are within the original image. For example, if the original image is an image of San Francisco, the 3D model may have an object for each structure (e.g., building and bridge) in San Francisco. The annotation system uses metadata associated with the original image to identify an object of the 3D model that corresponds to the selected object. To identify the selected object in the 3D model, the annotation system renders an image model of the 3D model based on the view (e.g., position and orientation of the camera) from which the original image was collected. For example, the annotation system renders the image model from approximately the same position and orientation of the camera that collected the original image. When the user selects the object from the original image, the annotation system uses a pixel corresponding to the selection to identify, from the corresponding pixel in the model image, the object of the 3D model that has been selected. The annotation system then associates the annotation with the identified object in the 3D model. (Note: The annotation system assumes that a 3D model of objects in the original image is available.)

The annotation system makes that annotation available not only to users who view the original image but also to users who view any other original image that includes the object. For example, the original image may be collected from a satellite that is east of San Francisco, and another original image may be collected from a satellite that is west of San Francisco. The annotation may have been added when a user selected an object of the original image corresponding to Coit Tower (the original image shows the east side of Coit Tower). The annotation system similarly renders another model image based on the view from which the other original image was collected. A user viewing the other original image may select an object of the other original image also corresponding to Coit Tower (the other original image shows the west side of Coit Tower). The annotation system uses a pixel corresponding to the selection to identify, from the corresponding pixel in the model image, the object of the 3D model that has been selected. For example, the object in the 3D model that has been selected may be Coit Tower. The annotation system then provides an annotation previously associated with the selected object in the 3D model. For example, the user is provided with the annotation that was provided when a user was viewing the original image that included Coit Tower. By associating annotations with objects in a 3D model, the annotation system can make those annotations available via any original image regardless of the view of the camera that collected that original image.

In some embodiments, an annotation system accesses an original image along with metadata of a camera that collected the original image. The metadata includes information that is based on, for example, the location of the camera (e.g., a geospatial coordinate), the orientation of the camera (e.g., pitch, roll, and yaw), and physical camera model. The metadata may include the RPCs for a satellite image. The annotation system then renders, based on the metadata of the camera a model image of a 3D model of one or more objects within the original image. The annotation system accesses a 3D model that includes objects that may appear in original images. The 3D model may be stored in the Collaborative Design Activity ("COLLADA") file format. The annotation system may use the OpenGL application programming interface ("API") to render the model image from the 3D model. The annotation system renders the model image so that it corresponds to the original image in the sense that the model image was collected from the 3D model view as the original image was collected. The annotation system displays the original image to the user but typically does not display the model image to the user. The annotation system then receives from the user a selection of a point (e.g., identified by a pixel coordinate) on the original image and an annotation. The annotation system then identifies, based on the corresponding point of the model image, the object of the 3D model to which the point corresponds. The annotation system may color-code the objects in the 3D model so that the color of the corresponding point in the model image identifies the object that has been selected. The annotation system then associates the annotation with the identified object in the 3D model. The annotation system then makes the annotation available when a user views any original image that includes that object, irrespective of the view from which an original image is collected.

In some embodiments, the annotation system generates a model image of a 3D model using a perspective transform matrix that is based on metadata associated with the original images. The perspective transform matrix is used when rendering a model image from the 3D model. The metadata includes information sufficient to identify a row number and a column number of a pixel of the original image that corresponds to a geospatial coordinate. For example, the metadata may include the RPCs for the original image that can be used to calculate the row number and the column number corresponding to a given geospatial coordinate. The annotation system identifies an origin pixel of the original image that is to be included in a model image. The origin pixel may represent the center point of the model image. The origin pixel has an origin row number and an origin column number in the original image. The model image has a model image height and a model image width in pixels. The annotation system uses the metadata to identify the origin geospatial coordinate associated with the origin pixel. For each of the easting, northing, and height directions, the annotation system generates a row transform factor and a column transform factor to transform geospatial coordinates of the 3D model to a clip range based on a pixel that corresponds to a geospatial coordinate that is a certain geospatial distance in that direction from the origin geospatial coordinate. For example, for the easting direction, the annotation system selects a location that is 100 meters due east of the origin geospatial coordinate. The annotation system then determines the row number and column number for the pixel that corresponds to that location. The column transform factor is based on a ratio of the number of pixels per meter from the origin geospatial coordinates to the location. The column transform factor may also factor in the model image width so that geospatial coordinates of the 3D model are mapped to x, y, and z coordinates in the range of $-1.0$ to $1.0$ that are centered on the origin pixel. The annotation system then generates a perspective transform matrix based on the row transform factors and the column transform factors. The annotation system then applies the perspective transform matrix to the 3D model to generate the model image. For example, the annotation system may use the OpenGL API to render the model image from the 3D model using the model image.

In some embodiments, the annotation system may need to align the model image with the original image. The images may not be aligned, for example, because of errors in the position and orientation of the satellite that lead to inaccuracies on the RPCs, or the height of the surface given by a Digital Elevation Map ("DEM") may not be precise enough. The alignment typically involves a translation (i.e., a row and column shift). The alignment could be performed by a user manually identifying corresponding pixels on the original image and the model image. Alternatively, the annotation system may automatically extract features from the images and align the corresponding features. The annotation system may use an alignment metric (e.g., based on least-squares distances) to determine whether the images are sufficiently aligned. The annotation system may extract the features of the images using various algorithms such as corners and edges detectors, difference of Gaussians algorithms, Scale-Invariant Feature Transform ("SIFT") algorithms, Speed-Up Robust Features ("SURF") algorithms, and so on. The annotation system may align the images using a geometric transform. Alternatively, the annotation system may use an affine transform, which corrects for translation, rotation, and scaling. The annotation system may estimate the parameters of the affine transform using a Random Sample Consensus ("RANSAC") algorithm, a Least Median Squares algorithm, and so on.

FIG. 1 is a diagram illustrating the overall processing for providing annotations based on a 3D model in some embodiments. Initially, a satellite 102 with a camera collects a satellite image 101 of the surface of the earth, which in this example includes a commercial facility 101a. The commercial facility may be a building with a smokestack. The satellite image 101 is provided to the annotation system. A user who wants to view a close-up of the commercial facility may select the commercial facility by pointing to the commercial facility 101a on the satellite image. A portion 103 of the satellite image 101 illustrates the close-up image of the commercial facility 101a. To add annotation indicators for the portion 103, the annotation system renders a model image 106 of a 3D model 105 of the commercial facility. The model image 106 is rendered based on a virtual camera 104 with a view that is similar to that of the satellite camera that collected the satellite image 101. The 3D model includes an annotation indicator 105a that indicates that an annotation is associated with the smokestack of the commercial facility 101a. The model image 106 thus includes the annotation indicator 105a at a certain pixel. The annotation system may add an annotation indicator to the portion 107 that is displayed to the user near the pixel of the portion 107 that corresponds to the certain pixel of the model image 106. When a user selects the annotation indicator on the portion 107, the annotation system may display the annotation 108. The annotation system may use a variety of techniques to present annotations. For example, an annotation indicator for the smokestack may be an icon positioned on the smokestack or an arrow pointing from a box that is off the portion 107 of the smokestack. The box may include the content of the annotation. The content of an annotation may include any type of information that the annotator may want. For example, an annotation may include text, links to documents (e.g., that when selected display the documents), links to other satellite images (e.g., of the same smokestack), and so on. The documents may include web pages, design documents (e.g., blueprints), governmental compliance documents, vacationers comments on places visited (e.g., hotel room and monuments), and so on. The annotations thus can be used for a variety of purposes including educational (e.g., study of ancient buildings), military (e.g., locating building information from an original image collected by a drone), other governmental, gaming, and so on.

Figure 2:
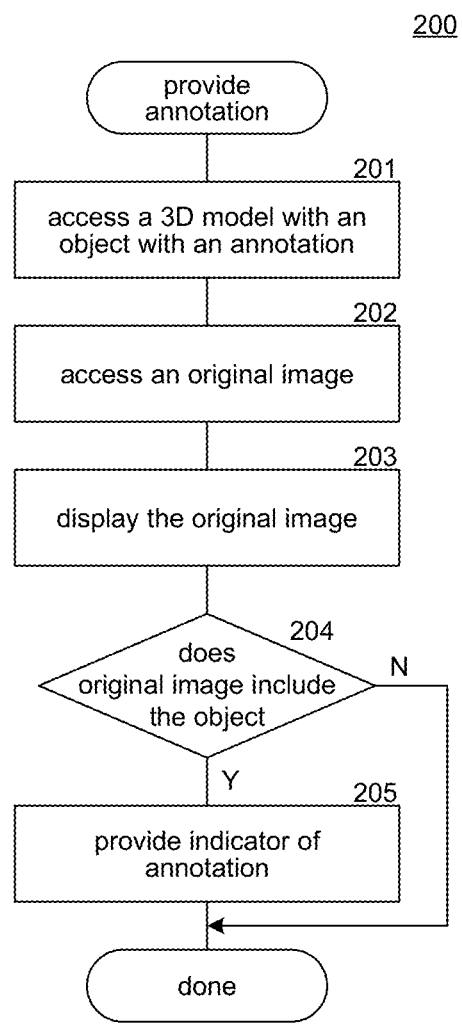
FIG. 2 is a flow diagram that illustrates overall processing of a provide annotation process in some embodiments.

FIG. 2 is a flow diagram that illustrates overall processing of a provide annotation process in some embodiments. A provide annotation component 200 provides annotations for original images. In block 201, the component accesses a 3D model that includes an object with an annotation. In block 202, the component accesses an original image. In block 203, the component displays the original image. In decision block 204, if the original image includes the object with the annotation, then the component continues at block 205, else the component completes. In block 205, the component provides an indicator of the annotation on the display of the original image and then completes. The indicator may be content of the annotation or selectable icon for displaying the content.

Figure 3:
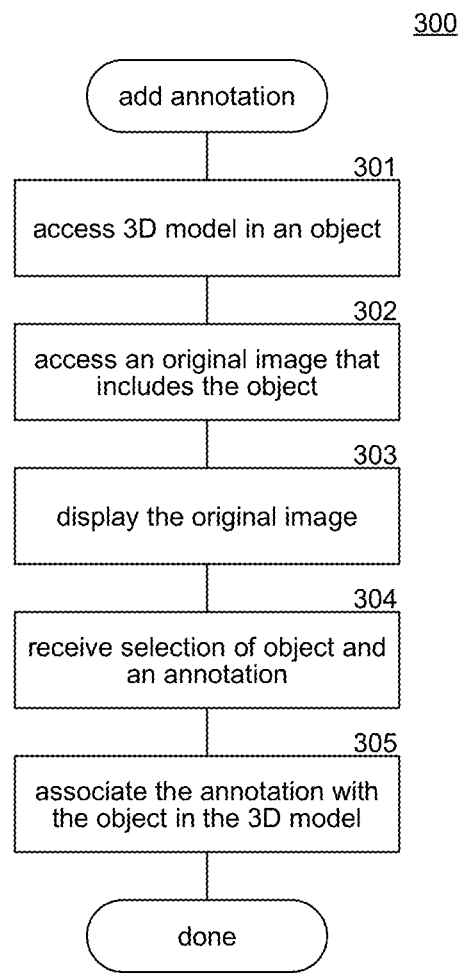
FIG. 3 is a flow diagram that illustrates overall processing of adding an annotation to a 3D model in some embodiments.

FIG. 3 is a flow diagram that illustrates overall processing of adding an annotation to a 3D model in some embodiments. An add annotation component 300 displays an original image and adds to the 3D model an annotation provided by a user. In block 301, the component accesses a 3D model that includes an object to be annotated. In block 302, the component accesses an original image that includes the object to be annotated. In block 303, the component displays the original image to a user. In block 304, the component receives from the user a selection of the object that is displayed in the original image along with an annotation. In block 305, the component associates the annotation with the object that is in the 3D model and then completes. The annotation is then available to be provided on original images of the object that are collected from different views.

In some embodiments, the annotation system uses geospatial metadata of a satellite image (i.e., original image) to generate a 2D image (i.e., model image) of a 3D model that has the same view as the satellite image. The geospatial metadata may be based on the RPC camera model. The RPC camera model expresses the mapping of the image coordinates of rows and columns (r, c) onto the object space reference surface geodetic latitude, longitude, and height ($\varphi$, $\lambda$, h). The RPC camera model defines a set of rational polynomials that expresses the normalized row and column values, ($r_n$, $c_n$) as a function of normalized geodetic latitude, longitude, and height (P, L, H), given a set of normalized polynomial coefficients:

LINE_NUM_COEF_n,
LINE_DEN_COEF_n,
SAMP_NUM_COEF_n, and
SAMP_DEN_COEF_n where LINE_NUM_COEF_n and LINE_DEN_COEF_n represent the $n^{th}$ coefficient for the numerator and denominator for calculating the line or row corresponding to (P, L, H) and SAMP_NUM_COEF_n and SAMP_DEN_COEF_n represent the $n^{th}$ coefficient for the numerator and denominator for calculating the sample or column corresponding to (P, L, H).

The RPC camera model uses normalized values, rather than actual values, to minimize introduction of errors during the calculations. The transformation between row and column values (r, c) and normalized row and column values ($r_n$, $c_n$), and between the geodetic latitude, longitude, and height ($\varphi$, $\lambda$, h) and normalized geodetic latitude, longitude, and height (P, L, H), is defined by:

$$P = (\varphi - \text{LAT\_OFF})/\text{LAT\_SCALE}$$

$$L = (\lambda - \text{LONG\_OFF})/\text{LONG\_SCALE}$$

$$H = (h - \text{HEIGHT\_OFF})/\text{HEIGHT\_SCALE}$$

$$r_n = (\text{Row} - \text{LINE\_OFF})/\text{LINE\_SCALE}$$

$$c_n = (\text{Column} - \text{SAMP\_OFF})/\text{SAMP\_SCALE}$$

where LAT_OFF, LONG_OFF, and HEIGHT_OFF are the geodetic offsets for the longitude, latitude, and height; LAT_SCALE, LONG_SCALE, and HEIGHT_SCALE are the geodetic scales for longitude, latitude, and height, LINE_OFF and SAMP_OFF are offsets for row and column, and LINE_SCALE and SAMP_SCALE are the scales for row and column.

The RPC equations are represented by the following equations:

$$r_n = \frac{\sum_{i=1}^{20} \text{LINE\_NUM\_COEF}_i \cdot \rho_i(P, L, H)}{\sum_{i=1}^{20} \text{LINE\_DEN\_COEF}_i \cdot \rho_i(P, L, H)} \text{ and}$$

$$c_n = \frac{\sum_{i=1}^{20} \text{SAMP\_NUM\_COEF}_i \cdot \rho_i(P, L, H)}{\sum_{i=1}^{20} \text{SAMP\_DEN\_COEF}_i \cdot \rho_i(P, L, H)}$$

where each numerator and denominator is represented by the following:

$$\sum_{i=1}^{20} C_i \cdot \rho_i(P, L, H) =$$

$$\begin{aligned}
& C_1 && + C_6 \cdot L \cdot H && + C_{11} \cdot P \cdot L \cdot H && + C_{16} \cdot P^3 \\
& + C_2 \cdot L && + C_7 \cdot P \cdot H && + C_{12} \cdot L^3 && + C_{17} \cdot P \cdot H^2 \\
& + C_3 \cdot P && + C_8 \cdot L^2 && + C_{13} \cdot L \cdot P^2 && + C_{18} \cdot L^2 \cdot H \\
& + C_4 \cdot H && + C_9 \cdot P^2 && + C_{14} \cdot L \cdot H^2 && + C_{19} \cdot P^2 \cdot H \\
& + C_5 \cdot L \cdot P && + C_{10} \cdot H^2 && + C_{15} \cdot L^2 \cdot P && + C_{20} \cdot H^3
\end{aligned}$$

where coefficients $C_1 \ldots C_{20}$ L represent LINE_NUM_COEF_n, LINE_DEN_COEF_n, SAMP_NUM_COEF_n, SAMP_DEN_COEF_n, and where the image coordinates are in units of pixels and the geodetic coordinates are latitude and longitude in units of decimal degrees and distance in units of meters from the center of the earth to sea level. The geodetic coordinates are referenced to the World Geodetic System of 1984 ("WGS-84").

In some embodiments, when a user selects a point on the satellite image, the annotation system determines the geospatial coordinate (i.e., relative to sea level) at ground level for the corresponding row number and column number of the selected point. Although the RPC equations map a geospatial coordinate for a location to a row number and column number, each location has a ray from the satellite camera to the surface maps to the same row and column. To identify the latitude and longitude for a given row number and column number at a certain height, the annotation system employs an iterative method (e.g., Newton-Raphson) until a solution is reached. The annotation system starts with an initial latitude and longitude and uses the RPC equations to iteratively determine the row number and column number for a given height at the current latitude and longitude and adjusts the latitude and longitude until the determined row number and column number equal the given row number and column number. To identify the geospatial coordinate at a location on the surface of the earth for a given row number and column number, the annotation system assumes a current height and calculates a (current) latitude and longitude using the iterative method discussed above. The current height may be set to the average of the heights of the satellite image as indicated by the satellite metadata or the average of heights in the area of the satellite image based on a DEM that maps latitude and longitude to surface height. The annotation system then performs an algorithm that repeats the following until the calculated geospatial coordinates converge. The annotation system determines the surface height for the current latitude and longitude using a DEM.

The annotation system then adjusts the current height based on the surface height. The annotation system calculates the latitude and longitude for the given row number and column number at the current height using the iterative method as discussed above. The annotation system then determines whether the newly calculated geospatial coordinate is sufficiently close to the previous geospatial coordinate to have converged on a solution. If so, the annotation system uses the current geospatial coordinate as the geospatial coordinate for the given row number and column number at the surface. The algorithm may be represented by the following pseudocode:

Given (r, c)
Set height based on average height from DEM or satellite metadata
Calculate (lat, lon) through iterative method using RPC equations until (r, c)=RPC(lat, lon, height)
Repeat
height$_a$=DEM(lat, lon)
$\Delta$height=height$_a$−height
height=height+($\alpha$*$\Delta$height) where 0.0≤$\alpha$≤1.0 (e.g., set to a number that allows smooth convergence such as 0.1)
Calculate (lat, lon) iteratively using RPC equations using original (r, c) and height until (r, c)=RPC(lat, lon, height)
Until (lat, lon, height) converge The result of this algorithm is the geospatial coordinate of (lat, lon, height$_c$) for the point with the pixel coordinate of (r0, c0) that is consistent with both the RPC and the DEM.

The annotation system uses the RPCs of the satellite image to generate a 2D image (i.e., model image) from the 3D model of the area represented by a portion of the satellite image. The annotation system generates a view and perspective transform matrix for OpenGL to render the model image from the 3D model. OpenGL transforms model coordinates, $\vec{m}$, to clip coordinates, $\vec{c}$, as follows:

$$\overline{M} \cdot \overline{V} \cdot \overline{P} \cdot \vec{m} = \vec{c}$$

where:
$\overline{M}, \overline{V}, \overline{P}$=the model, view, and perspective transformation matrices $\vec{m} = (E, N, H, 1)$ E, N, H=easting, northing, and height coordinates in model space (meters)

$\vec{c} = (x_{clip}, y_{clip}, z_{clip}, w_{clip})$ $x_{clip}, y_{clip}, z_{clip}, w_{clip}$=OpenGL clip coordinates The model transform (or transformation) matrix is used for rotations and translations, the view transform matrix is used to account for the orientation of the camera, and the perspective transform matrix is used to generate the clip coordinates. The annotation system does not provide the model transformation matrix to OpenGL. The annotation system provides a view transform matrix that is set to the identity matrix. Since lighting occurs after the view transform matrix has been applied, a view transformation that is set to the identity matrix preserves the surface normal information needed for lighting.

Figure 4:
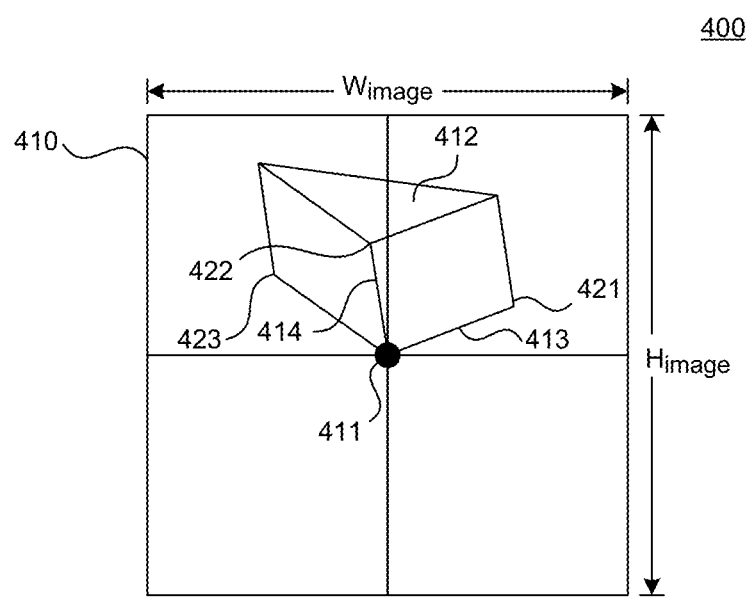
FIG. 4 is a diagram that illustrates the prism.

To generate the perspective transform matrix, the annotation system employs a right triangular prism located at the origin (e.g., center) of the model image. FIG. 4 is a diagram that illustrates the prism. A satellite image 400 includes a portion 410 that corresponds to the desired model image. An origin pixel 411 is to be the center of the model image and is also the origin of the prism 412. The right triangular prism has square faces aligned with the northing vector 414 and the easting vector 413 of the satellite image. The annotation system selects a point at a common distance along each of the three vectors. For example, the points 421, 422, and 423 may be 100 meters away from the origin along the northing, easting, and height vectors. The annotation system uses the RPC equations to find a real number (e.g., not necessarily integers) 2D image coordinate (column, row) for each of these points as $(c_E, r_E), (c_N, r_N), (c_H, r_H)$ where $(c_E,r_E),(c_N,r_N),(c_H,r_H)$=The original image column and row coordinate of the endpoints of the easting, northing, and height vectors, relative to the origin pixel (lower left origin)

The edges, in object space, of the prism are parallel to the northing, easting, and height direction vectors, namely:

$\vec{D}_E = (L_E, 0, 0)$ $\vec{D}_N = (0, L_N, 0)$ $\vec{D}_H = (0, 0, L_H)$ $L_E, L_N, L_H$=$L$=Length, in meters, of the Easting, Northing, and Height vectors The annotation system uses these image coordinates for the three prism points to solve the OpenGL perspective matrix (actually, $\vec{V} \times \vec{P}$ as the view transform matrix is the identity matrix) as follows:

$$\overline{V} \cdot \overline{P} = \begin{bmatrix} \left(\frac{2 \cdot c_E}{L_E \cdot W_{image}}\right) & \left(\frac{2 \cdot c_N}{L_N \cdot W_{image}}\right) & \left(\frac{2 \cdot c_H}{L_H \cdot W_{image}}\right) & 0 \\ \left(\frac{2 \cdot r_E}{L_E \cdot H_{image}}\right) & \left(\frac{2 \cdot r_N}{L_N \cdot H_{image}}\right) & \left(\frac{2 \cdot r_H}{L_H \cdot H_{image}}\right) & 0 \\ 0 & 0 & -\left(\frac{1}{\alpha(L_H)}\right) & 0 \\ 0 & 0 & 0 & 1 \end{bmatrix} \begin{bmatrix} E \\ N \\ H \\ 1 \end{bmatrix} =$$

$$\begin{bmatrix} x_{clip} \\ y_{clip} \\ z_{clip} \\ w_{clip} \end{bmatrix} = \begin{bmatrix} x_{clip} \\ y_{clip} \\ z_{clip} \\ 1 \end{bmatrix}$$

where:

$W_{image}, H_{image}$ ≡ Image Width and Height, in pixels $\alpha$ ≡ arbitrary $z$ scaling factor, must be > 1.0 (we chose 10.0)

$c_{image} = c_{pixel} - c_{origin}$ $r_{image} = -(r_{pixel} - r_{origin})$ $x_{clip} = \frac{2 \cdot c_{image}}{W_{image}}$ $y_{clip} = \frac{2 \cdot r_{image}}{H_{image}}$ The annotation system may set $w_{clip}$ to 1.0, which implies that any values of $x_{clip}$, $y_{clip}$, and $z_{clip}$ outside the range of $[-w_{clip}, w_{clip}] = [-1.0, 1.0]$ will be clipped and implies that there are no perspective corrections. As a result, this transform matrix will work only for images that exhibit very little perspective (e.g., images taken at large standoff distances). Any perspective corrections would involve (at least) modifying the fourth row of the matrix by providing a $w_{clip}$ value other than 1.0.

If the change in perspective is severe enough to require perspective corrections, the transform matrix will not help with image correction and enhancement ("ICE"), which requires the reuse of projections within an image block, and (ideally) over many image blocks (for efficiency). If perspective changes enough over a single image block (nominally 512×512 pixels), then ICE will likely fail, since it uses a single projection set when processing an image block. The lack of perspective corrections, therefore, is generally not an issue as far as ICE is concerned.

The annotation system selects a value of $\alpha$ to prevent z-clipping of the objects being rendered. The annotation system sets the value to be larger than the largest expected height value. For example, the annotation system may set the value in the transform matrix to a multiple of $L_H$, with $\alpha$ being set to a value of 10.0. This value may affect only whether points are clipped due to their z-height and not affect the output x and y pixel positions. The row that produces the z-value does not end up preserving surface normal information (since the easting and northing components are ignored, the proper vector rotations may not be calculated).

The annotation system may set the easting, northing, and height lengths ($L_E$, $L_N$, $L_H$) to 100 meters and the model image width and height ($W_{image}$, $H_{image}$) to 1024 pixels.

To create a view transform matrix, $\overline{V}$, the annotation system uses values for the x, y, and z components in the z-row of the matrix. These components create z-values along an axis that is perpendicular to the x and y axes. The annotation system takes the cross product of the x and y direction vectors contained in the first two rows of the above transform matrix and normalizes the cross products using a scaling factor. That resulting transform matrix is as follows:

$$\overline{V} \cdot \overline{P} = \begin{bmatrix} \left(\frac{2 \cdot c_E}{L_E \cdot W_{image}}\right) & \left(\frac{2 \cdot c_N}{L_N \cdot W_{image}}\right) & \left(\frac{2 \cdot c_H}{L_H \cdot W_{image}}\right) & 0 \\ \left(\frac{2 \cdot r_E}{L_E \cdot H_{image}}\right) & \left(\frac{2 \cdot r_N}{L_N \cdot H_{image}}\right) & \left(\frac{2 \cdot r_H}{L_H \cdot H_{image}}\right) & 0 \\ \beta\left(\frac{4 \cdot (c_N r_H - c_H r_N)}{L^2 W_{image} H_{image}}\right) & \beta\left(\frac{4 \cdot (c_H r_E - c_E r_H)}{L^2 W_{image} H_{image}}\right) & \beta\left(\frac{4 \cdot (c_E r_N - c_N r_E)}{L^2 W_{image} H_{image}}\right) & 0 \\ 0 & 0 & 0 & 1 \end{bmatrix}$$

-continued $$\begin{bmatrix} E \\ N \\ H \\ 1 \end{bmatrix} = \begin{bmatrix} x_{clip} \\ y_{clip} \\ z_{clip} \\ 1 \end{bmatrix}$$

The annotation system may set β to a negative number that is close in scale to the x and y terms such as possibly scaled to produce a unit vector or one of magnitude $$\frac{1}{L_N \cdot W_{image}}.$$

The matrices described above may be represented as follows:

$$\overrightarrow{V} \cdot \overrightarrow{P} \cdot \vec{m} = \begin{bmatrix} x_x & x_y & x_z & x_w \\ y_x & y_y & y_z & y_w \\ z_x & z_y & z_z & z_w \\ w_x & w_y & w_z & w_w \end{bmatrix} \begin{bmatrix} m_x \\ m_y \\ m_z \\ m_w \end{bmatrix} = \begin{bmatrix} c'_x \\ c'_y \\ c'_z \\ c'_w \end{bmatrix} = \vec{c'}$$

where $\overrightarrow{V}$, $\overrightarrow{P}$, $\vec{m}$, and $\vec{c'}$ are the view transform matrix, the perspective transform matrix, the model coordinates, and the clip coordinates, respectively. In addition, $m_w=1.0$ and $\vec{c'}$ is known (calculated from RPC data), along with $x_x \ldots z_w$, leaving $w_x \ldots w_w$ unknown. This creates a system of linear equations using values of $\vec{c'}$ (calculated from selected values of $\vec{m}$), as follows:

$$\vec{a} \equiv \begin{bmatrix} \left(\frac{c'_x}{c'_w}\right) \\ \left(\frac{c'_y}{c'_w}\right) \\ \left(\frac{c'_z}{c'_w}\right) \end{bmatrix} = \begin{bmatrix} a_x \\ a_y \\ a_z \end{bmatrix}$$

where $\vec{a}$ is the perspective corrected values at some given model coordinate location, $\vec{m}$, which are known through an RPC calculation. The solution for the parameters $w_x \ldots w_w$ provide a value for $c'_w$, which is the value that provides perspective corrections in OpenGL.
Since:

$$c'_x = x_x m_x + x_y m_y + x_z m_z + x_w$$

$$c'_w = w_x m_x + w_y m_y + w_z m_z + w_w$$

Then:

$$a_x = \frac{x_x m_x + x_y m_y + x_z m_z + x_w}{w_x m_x + w_y m_y + w_z m_z + w_w}$$

$$x_x m_x + x_y m_y + x_z m_z + x_w = a_x (w_x m_x + w_y m_y + w_z m_z + w_w)$$

$$w_x m_x + w_y m_y + w_z m_z + w_w = \frac{x_x m_x + x_y m_y + x_z m_z + x_w}{a_x}$$

Note that the right-hand side of the equation consists of all known values, while the $w_x$ parameters on the left-hand side are the unknowns.
Similar equations exist for the y and z values, namely:

$$w_x m_x + w_y m_y + w_z m_z + w_w = \frac{y_x m_x + y_y m_y + y_z m_z + y_w}{a_y}$$

$$w_x m_x + w_y m_y + w_z m_z + w_w = \frac{z_x m_x + z_y m_y + z_z m_z + z_w}{a_z}$$

To solve for $\vec{w} = (w_x \ldots w_w)$, a collection of input points $\vec{m}$ may be used to calculate points d (from RPC data, using $\vec{m}$) to generate enough input points for a least squares algorithm to find values of $\vec{w}$.

Figure 5:
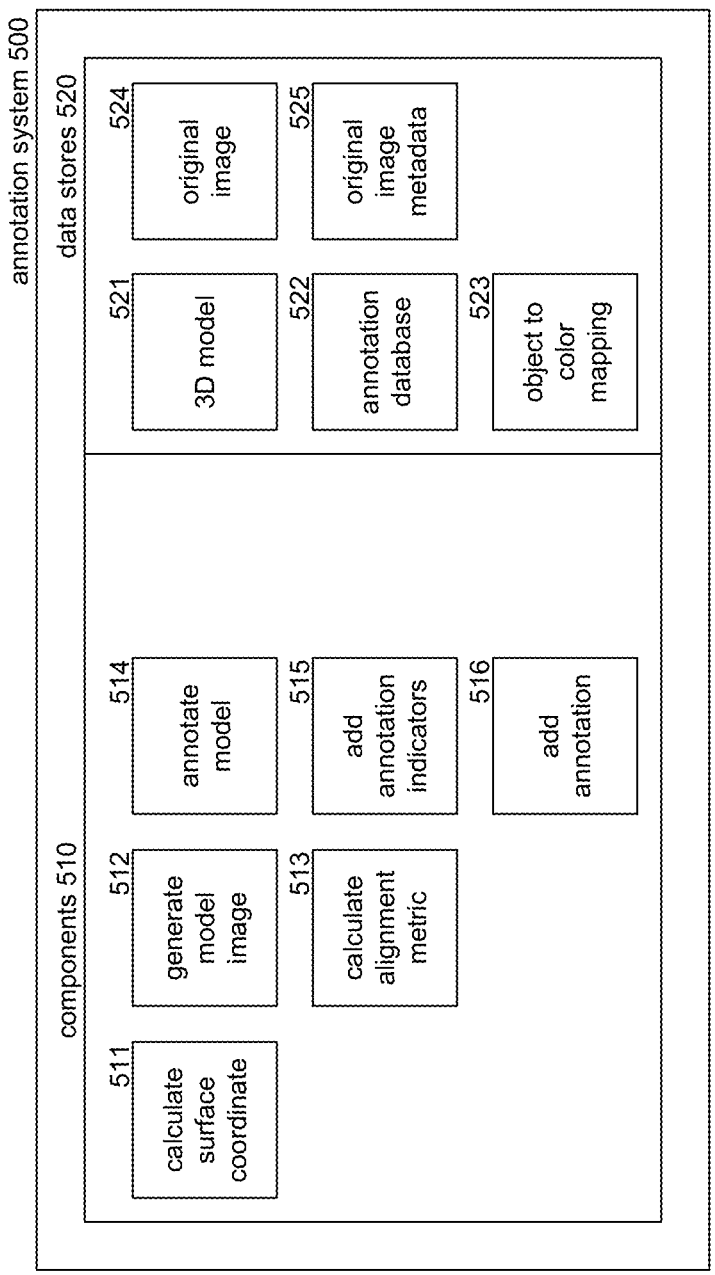
FIG. 5 is a block diagram that illustrates components and data stores of an annotation system in some embodiments.

FIG. 5 is a block diagram that illustrates components and data stores of an annotation system in some embodiments. An annotation system 500 includes components 510 and data stores 520. The components include a calculate surface coordinate component 511, a generate model image component 512, a calculate alignment metric component 513, an annotate model component 514, an add annotation indicators component 515, and an add annotation component 516. The data stores may include a 3D model store 521, an annotation database 522, an object to color mapping 523, an original image 524, and original image metadata 525. The calculate surface coordinate component determines the surface geospatial coordinate corresponding to a pixel in an original image. The generate model image component generates a model image corresponding to the original image. The calculate alignment metric component determines whether a rendered model image is aligned with an original image. The annotate model component controls the adding of an annotation to an object in the 3D model. The add annotation indicator component adds annotation indicators to the original image for display to a user. The add annotation component receives an annotation from a user and adds the annotation to the corresponding object in the 3D model. The 3D model data store stores a 3D representation of objects including an object within the original image. The annotation database stores annotations that have been added to objects of the 3D model. The annotation database may include a unique identifier for each annotation, the content of the annotation, and a reference to the associated object of the 3D model. The object to color mapping may contain a mapping of each color that is currently assigned to an object of the 3D model that is included in the original image. The original image represents, for example, the satellite image or portion of a satellite image that is displayed to the user for accessing annotations. The original image metadata represents, for example, the satellite metadata such as the RPCs.

The computing systems on which the annotation system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the annotation system. The data transmission media are used for transmitting data via transitory, propagating signals or carrier waves (e.g., electromagnetism) via a wired or wireless connection.

The annotation system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the annotation system may be implemented in hardware using, for example, an application-specific integrated circuit (ASIC).

Figure 6:
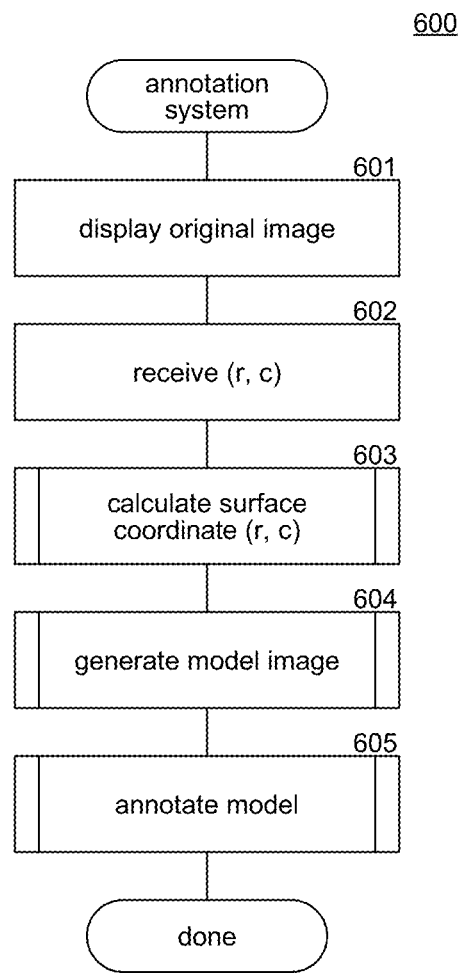
FIG. 6 is a flow diagram that illustrates the processing of an annotation component in some embodiments.

FIG. 6 is a flow diagram that illustrates the processing of an annotation component in some embodiments. An annotation component 600 allows users to add annotations to objects in a 3D model so that the annotations can be provided to users viewing original images that include objects in the 3D model irrespective of the position and orientation of the camera that collects the original images. In block 601, the component displays an original image to a user. In block 602, the component receives from the user a selection of a point of the original image. The point may be identified by pixel coordinates of the original image. In block 603, the component invokes a calculate surface coordinate component passing an indication of the row number and column number to calculate the corresponding geospatial coordinates at the surface for that row number and column number. In block 604, the component invokes the generate model image component to generate a model image based on the view of the camera that collected the original image and that is aligned to the original image. In block 605, the component invokes an annotate model component to add and/or display annotations and then completes.

Figure 7:
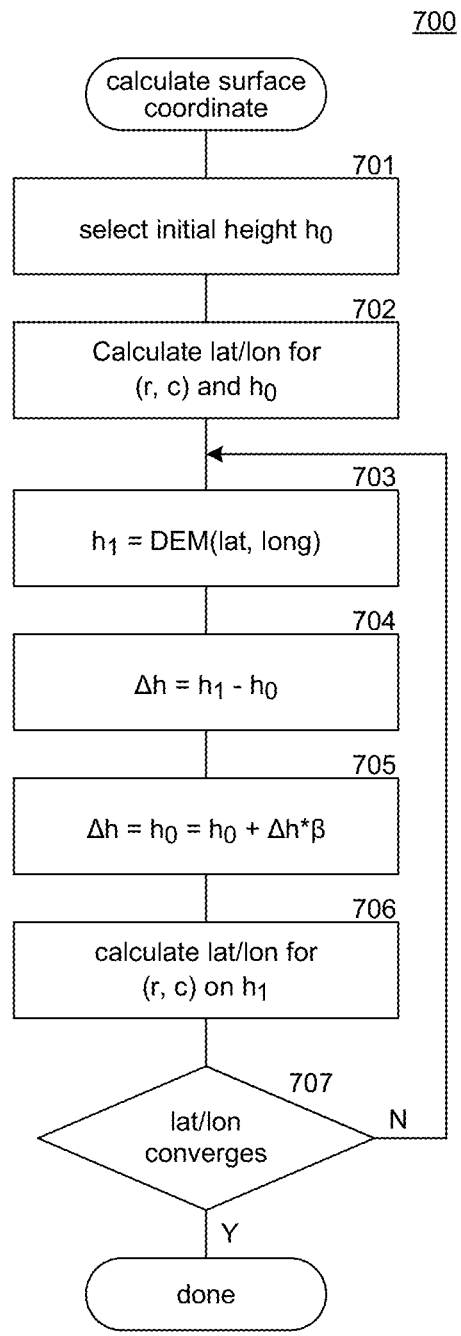
FIG. 7 is a flow diagram that illustrates processing of a calculate surface coordinate component in some embodiments.

FIG. 7 is a flow diagram that illustrates processing of a calculate surface coordinate component in some embodiments. A calculate surface coordinate component 700 calculates the surface geospatial coordinates for a given row number and column number of an original image. In block 701, the component selects an initial height for the surface geospatial coordinate, such as the average height of the original image indicated by metadata associated with the original image. In block 702, the component calculates the latitude and longitude for the row number and column number at the initial height. In blocks 703-707, the component loops refining the height until the surface geospatial coordinates corresponding to the row number and column number converge on a solution. In block 703, the component calculates an actual height based on the current latitude and longitude. In block 704, the component calculates an adjustment factor for the height. In block 705, the component adjusts the height based on the adjustment factor. In block 706, the component calculates the latitude and longitude for the row number and column number at the current height. In decision block 707, if the latitude and longitude are converging on a solution, then the component returns indicating that the surface geospatial coordinate is the current latitude, longitude, and height for the row number and column number, else the component loops to block 703 to repeat the process.

Figure 8:
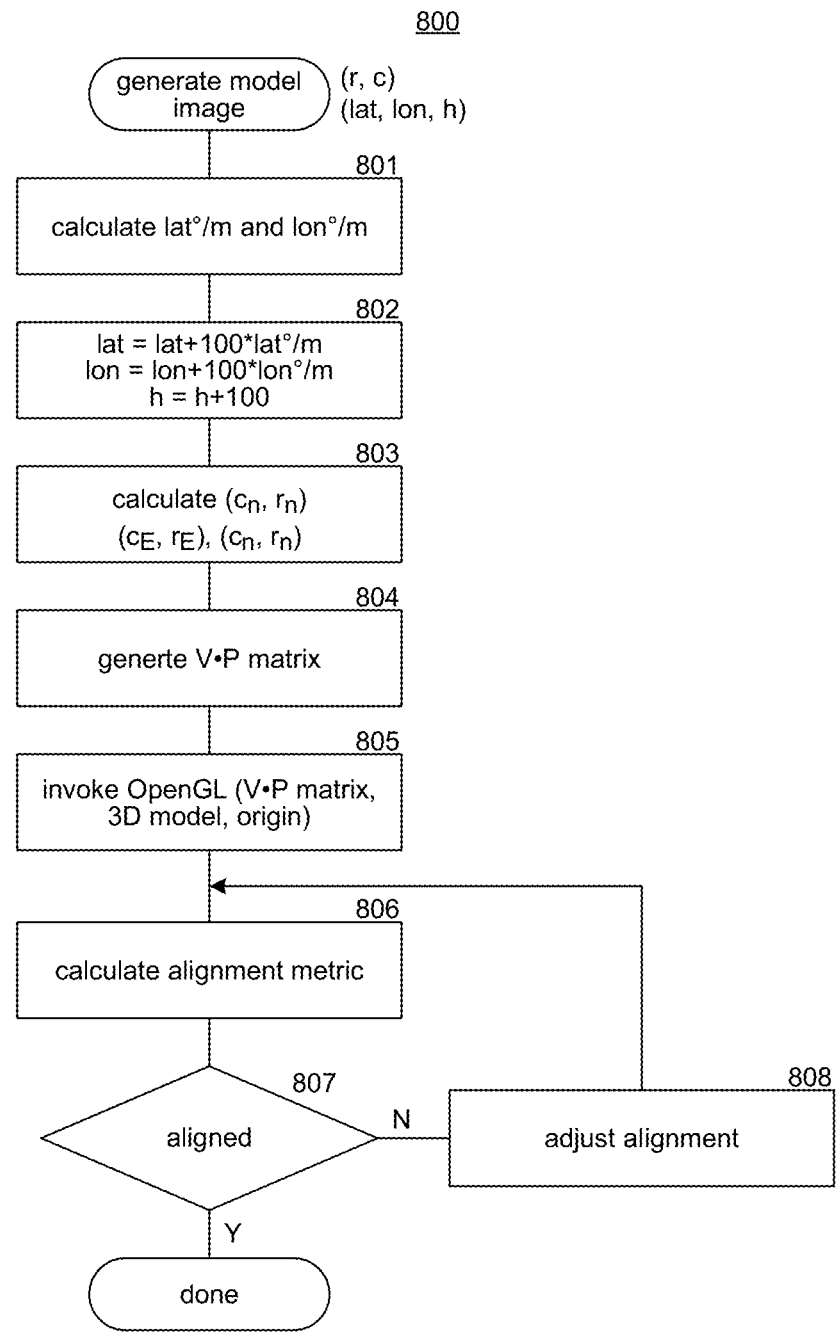
FIG. 8 is a flow diagram that illustrates the processing of a generate model image component of the annotation system in some embodiments.

FIG. 8 is a flow diagram that illustrates the processing of a generate model image component of the annotation system in some embodiments. A generate model image component 800 is passed an indication of a row number and column number and the corresponding surface geospatial coordinate of an origin point and generates a model image that is aligned with the original image. In block 801, the component calculates the degrees of latitude per meter and the degrees of longitude per meter at the origin point. In block 802, the component calculates the geospatial coordinates for points that are a certain distance in the easting direction, the northing direction, and the height direction from the surface geospatial coordinates. For example, the point in the easting direction has a longitude of the origin plus 100 times the degrees of longitude per meter and a latitude and height that are the same as the origin point. In block 803, the component calculates the corresponding row numbers and column numbers for the points in the easting, the northing, and the height directions. In block 804, the component generates a perspective matrix as discussed above. In block 805, the component invokes the OpenGL API passing an indication of the perspective matrix, the 3D model, and the origin point to render a model image. In block 806, the component calculates an alignment metric to assess how closely the model image is aligned with the original image. In block 807, if the images are sufficiently aligned, then the component completes, else the component continues at block 808. In block 808, the component adjusts the alignment, for example, by applying a geometric transform, and then loops to block 806 to calculate a new alignment. The component may align the model image with the original image based on identified features within the images. For example, the user may manually specify corresponding points within the model image and the original image. Alternatively, the component may automatically identify features such as edges within the model image and original image and translate and rotate the model image to be more aligned with the original image.

Figure 9:
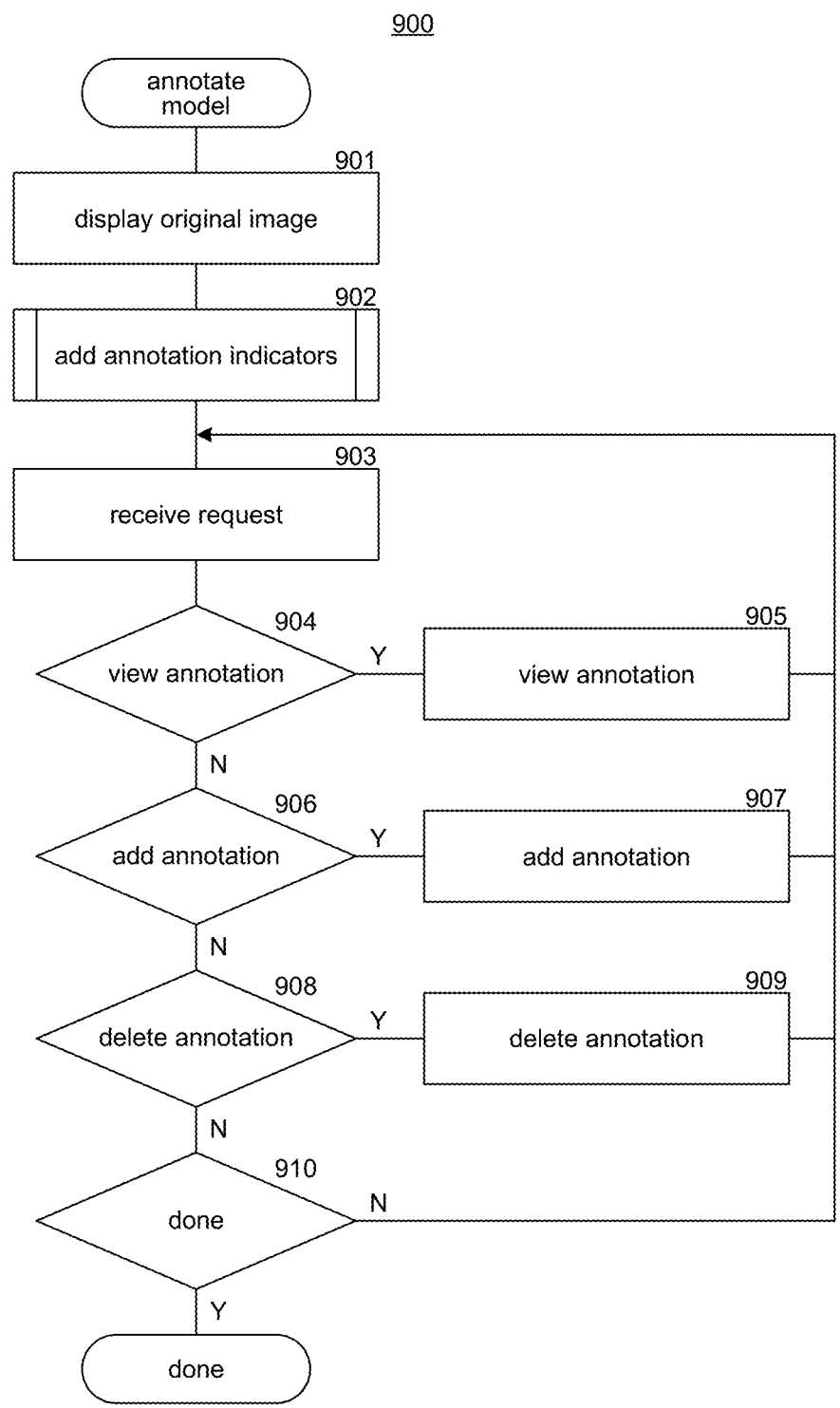
FIG. 9 is a flow diagram that illustrates the processing of an annotate model component of the annotation system in some embodiments.

FIG. 9 is a flow diagram that illustrates the processing of an annotate model component of the annotation system in some embodiments. An annotate model component 900 processes the annotations for a model image. In block 901, the component displays the original image that corresponds to a rendered model image. In block 902, the component invokes an add annotation indicators component to add indicators of annotations to the displayed original image. In blocks 903-910, the component loops allowing a user to view annotations, add annotations, and delete annotations. In block 901, the component receives an annotation request from the user. In decision block 904, if the request is to view an annotation, then the component continues at block 905, else the component continues at block 906. In block 905, the component retrieves the annotation corresponding to the annotation indicator that was selected by the user and displays the annotation and then loops to block 903. In decision block 906, if the request is to add an annotation, then the component continues at block 907, else the component continues at block 908. In block 907, the component adds the annotation received from the user for a point of the original image for the corresponding object of the 3D model to the annotation database and then loops to block 903. In decision block 908, if the user indicates to delete an annotation, then the component continues at block 909, else the component continues at block 910. In block 909, the component deletes the annotation selected by the user for the corresponding object of the 3D model from the annotation database and then loops to block 903. In decision block 910, if the user is done, the component completes, else the component loops to block 903.

Figure 10:
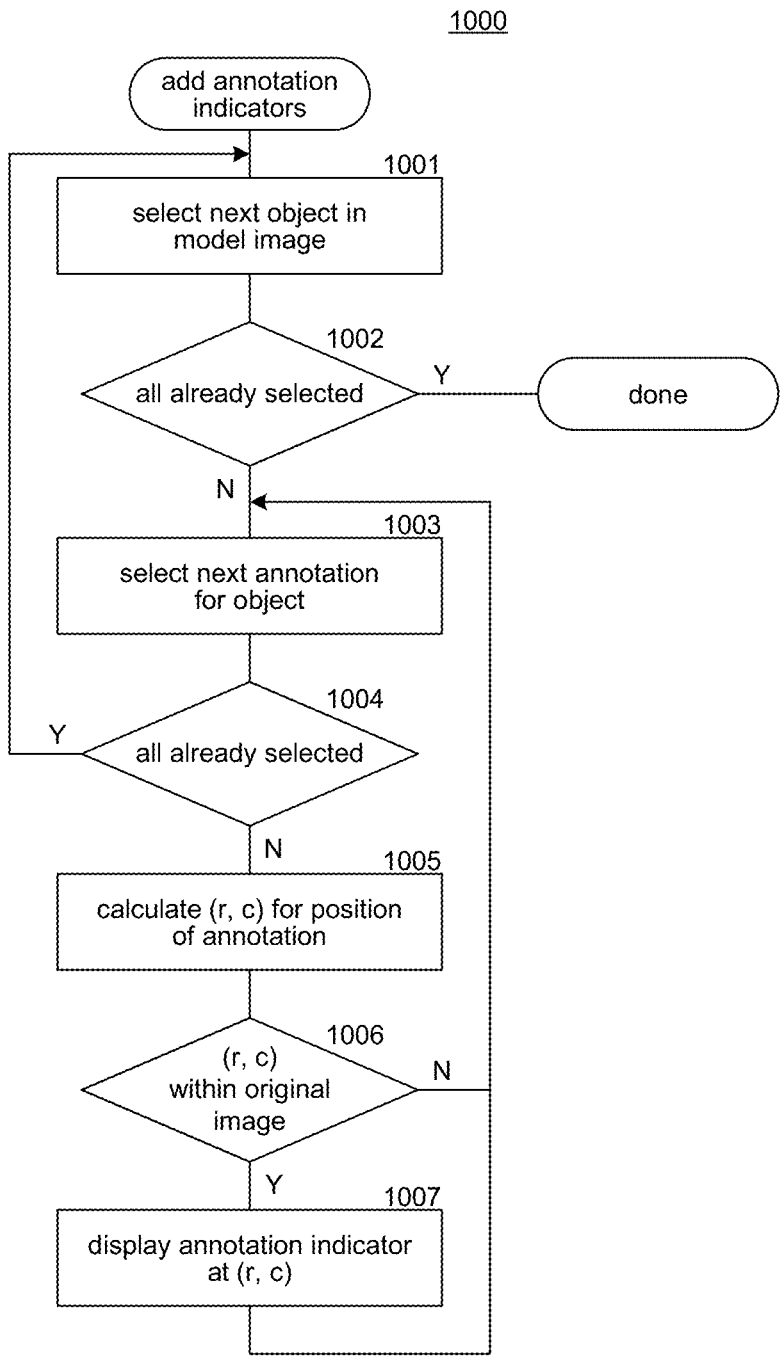
FIG. 10 is a flow diagram that illustrates processing of an add annotation indicators component of the annotation system in some embodiments.

FIG. 10 is a flow diagram that illustrates processing of an add annotation indicators component of the annotation system in some embodiments. An add annotation indicators component 1000 adds annotation indicators to an original image. In block 1001, the component selects the next object in the model image. In decision block 1002, if all the objects have already been selected, then the component completes, else the component continues at block 1003. In block 1003, the component selects the next annotation for the selected object. In decision block 1004, if all the annotations for the selected object have already been selected, then the component loops to block 1001 to select the next object, else the component continues at block 1005. In block 1005, the component calculates the row number and column number for the position of the annotation indicator. In decision block 1006, if the row number and column number are within the original image that is being displayed, then the component continues at block 1007, else the component loops to block 1003 to select the next annotation for the selected object. In block 1007, the component displays an annotation indicator at the row number and column number of the original image and then loops to block 1003 to select the next annotation for the selected object.

Figure 11:
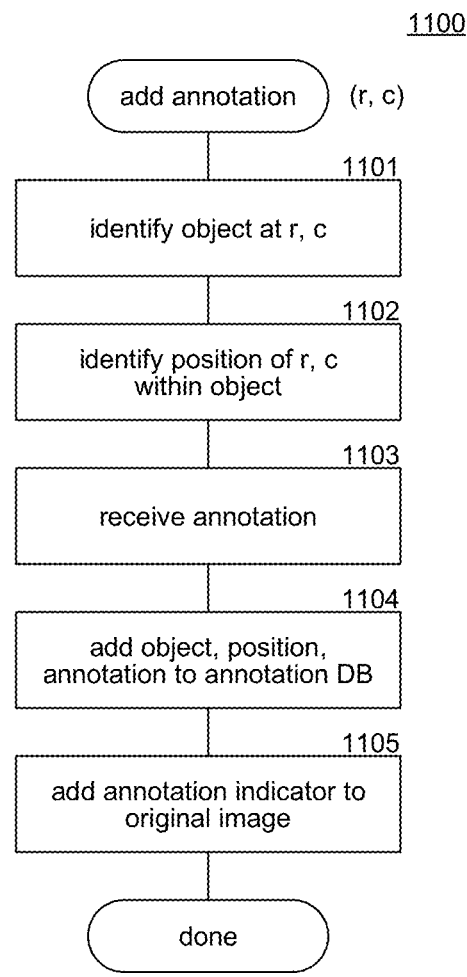
FIG. 11 is a flow diagram that illustrates the processing of an add annotation component of an annotation system in some embodiments.

FIG. 11 is a flow diagram that illustrates the processing of an add annotation component of an annotation system in some embodiments. An add annotation component 1100 is passed a row number and column number and adds an annotation to the object of the 3D model that corresponds to that row number and column number. In block 1101, the component identifies the object and the row number and column number based on the color-coded model image. In block 1102, the component identifies the position of the row number and column number within the object. For example, one annotation may be associated with the base of the smokestack, and another annotation may be associated with the top of the smokestack. In block 1103, the component receives an annotation from the user. In block 1104, the component adds an identifier of the object, the position of the annotation on the object, and the annotation to the annotation database. In block 1105, the component adds an annotation indicator to the original image and then completes.

The following paragraphs describe various embodiments of aspects of the annotation system. An implementation of the annotation system may employ any combination of the embodiments. The processing described below may be performed by a computing device with a processor that executes computer-executable instructions stored on a computer-readable storage medium that implements the annotation system.

In some embodiments, a method performed by a computing system for providing annotations for original images is provided. The method accesses an annotation associated with an object of a 3D model. The method accesses an original image and displays the original image. When the original image includes the object, the method provides an indication that an annotation is associated with the object of the original image. In some embodiments, the method further comprises displaying on the original image an annotation indicator and, when a user selects the object, providing the annotation to the user. In some embodiments, further comprises determining that the original image includes the object by rendering a model image of the 3D model from a view from which the original image was collected so that objects in the model image can be identified. In some embodiments, the model image is aligned with the original image. In some embodiments, objects of the 3D model are color-coded so that when a user selects a pixel in the original image, the corresponding pixel in the model image is used to identify the corresponding object. In some embodiments, the corresponding object is identified based on a color coding of objects of the 3D model that results in different objects having different colors in the model image. In some embodiments, the method further accesses another original image collected from a view that is different from a view from which the original image was collected, determines that the other original image includes the object of the 3D model, displays the other original image, and provides an indication that an annotation is associated with the object of the other original image. In some embodiments, the method further receives a selection of another object in the original image, receives another annotation to be associated with the other object, and associates the other annotation with the other object of the 3D model. In some embodiments, the other annotation is associated with a position within the other object.

In some embodiments, a method performed by a computing system for providing annotations for original images is provided. The method accesses a 3D model that includes an object. The method accesses an original image that includes the object and displays the original image. When a user selects the object in the original image and provides an annotation, the method associates the annotation with the object of the 3D model. In some embodiments, the method further accesses another original image that includes the object, the other original image collected from a view that is different from a view from which the original image was collected, displays the other original image, and provides an indication that an annotation is associated with the object of the original image based on the annotation associated with the object of the 3D model. In some embodiments, the method further determines that the original image includes the object by rendering a model image of the 3D model from a view from which the original image was collected so that the objects in the model image can be identified. In some embodiments, the model image is aligned with the original image. In some embodiments, objects of the 3D model are color-coded so that when a user selects a pixel in the original image, the pixel in the model image is used to identify the corresponding object.

In some embodiments, a method performed by a computing system for annotating imagery is provided. The method accesses an original image along with metadata based on a view of a camera that collected the original image. The method renders based on the metadata a model image of a 3D model of one or more objects within the original image. The method displays to a user the original image. The method receives from the user a selection of a point on the original image and an annotation. The method identifies, based on the corresponding point of the model image, the object of the 3D model to which the point corresponds. The method then associates the annotation with the identified object of the 3D model. In some embodiments, the point is a pixel of the original image and the original image and the model image are aligned so that a pixel in the original image that corresponds to a location on an object and a corresponding pixel in the model image corresponds to the same location on the object of the 3D model. In some embodiments, a pixel in the original image and a pixel in the model image correspond when they have a row number and column number that are the same. In some embodiments, the objects of the 3D model are colored so that each object in the model image has a unique color and wherein the identification of the object of the 3D model determines the color of the corresponding pixel of the model image and identifies the object based on the determined color. In some embodiments, the method further adds to the 3D model an annotation identifier for each existing annotation so that the model image includes the annotation identifier of any existing annotation of an object of the 3D model that is in the model image. In some embodiments, the method further generates metadata for each pixel of the model image that identifies the object of the 3D model to which the pixel corresponds. In some embodiments, the metadata for a pixel includes an annotation identifier for the annotation associated with that pixel. In some embodiments, the method further identifies a position on the object to which the point corresponds and wherein the associating of the annotation with the identified object includes storing a mapping of the position of the object to the annotation. In some embodiments, the mapping further identifies the object of the 3D model. In some embodiments, the method further determines whether alignment of the model image with the original image satisfies an alignment criterion and when the alignment does not satisfy the alignment criterion, applies a transform to align the model image with the original image. In some embodiments, the alignment criterion is based on closeness of features of the model image to the corresponding features of the original image. In some embodiments, the camera is on a satellite and the metadata for the original image includes metadata based on a rational polynomial coefficient model. In some embodiments, the method further determines a latitude, longitude, and height to which a target pixel at a target row number and a target column number of the original image corresponds by assuming a height, determining a latitude and longitude that corresponds to the target pixel at the height, and iteratively: determining a surface height at the latitude and longitude, adjusting the height based on the surface height, and determining a new latitude and longitude that corresponds to the target pixel at the adjusted height until the latitude, longitude, and adjusted height converge on a solution. In some embodiments, the surface height is determined from a digital elevation map.

In some embodiments, a method performed by a computing system for presenting annotations of imagery is provided. The method provides an association between an annotation and an annotated object of a 3D model. The method accesses an original image along with metadata based on a view of a camera that collected the original image. The original image includes at least a portion of the annotated object. The method renders based on the metadata a model image of the 3D model of one or more objects within the original image. The method identifies based on the rendered image a pixel in the original image that corresponds to the annotated object. The method adds an annotation indicator positioned by the identified pixel and displaying the original image with the annotation indicator. In some embodiments, the method further in response to receiving from a user a selection of the annotation indicator, displays the annotation. In some embodiments, the original image and the model image are aligned so that a pixel in the original image that corresponds to a location on an object of the 3D model and a corresponding pixel in the model image correspond to the same location on the same object of the 3D model. In some embodiments, a pixel in the original image and a pixel in the model image correspond when they have a row number and column number that are the same. In some embodiments, the method further adds to the 3D model an annotation identifier for the annotation for identifying the annotation corresponding to the annotated object. The method further generates metadata for each pixel of the model image, the metadata indicating an object, if any, of the 3D model to which the pixel corresponds. In some embodiments, the annotation is associated with a position on the annotated object.

In some embodiments, a method performed by a computing system for rendering a model image of a 3D model is provided. The method accesses an original image along with metadata based on a view of a camera that collected the image. The metadata is for determining a row number and a column number of the original image that correspond to a geospatial coordinate. The method identifies an origin pixel of the original image. The origin pixel has an origin row number and an origin column number and an image height and an image width in pixels. The method uses the metadata to identify an origin geospatial coordinate associated with the origin pixel. For each easting, northing, and height direction, the method generates a row transform factor and a column transform factor to transform geospatial coordinates of the 3D model to a clip range based on a pixel that corresponds to a geospatial coordinate that is a certain geospatial distance in that direction from the origin geospatial coordinate. The method generates a perspective transform matrix based on the row transform factors and the column transform factors. The method applies the perspective transform matrix to the 3D model to generate the model image. In some embodiments, for each direction, the generating of the row transform factor and the column transform factor includes: identifying a sample row number and a sample column number relative to the origin row number and origin column number of a sample pixel for that direction corresponding to the certain geospatial distance in that direction from the origin geospatial coordinate, setting the row transform factor based on a number of pixels per distance derived from the sample row number and the image height, and setting the column transform factor based on a number of pixels per distance derived from the sample column number and the image width. In some embodiments, the original image is a satellite image and the metadata includes rational polynomial coefficients. In some embodiments, the method further generates a new perspective transform matrix based on a different origin and applying the new perspective transform matrix to the 3D model to generate a new model image corresponding to a different portion of the original image. In some embodiments, the new model image is generated to account for perspective in the original image.

In some embodiments, a computing system for providing annotations for original images is provided. The computing system comprising a processor for executing computer-executable instructions and a computer-readable storage medium storing computer-executable instructions. When executed by the processor in instructions access an annotation associated with an object of a 3D model, access an original image, display the original image, when the original image includes the object, provide an indication that an annotation is associated with the object of the original image. In some embodiments, the computer-executable instructions that when executed by the processor further display on the original image an annotation indicator and, when a user selects the object, provide the annotation to the user. In some embodiments, the computer-executable instructions that when executed by the processor further determine that the original image includes the object by rendering a model image of the 3D model from a view from which the original image was collected so that objects in the model image can be identified. In some embodiments, the model image is aligned with the original image. In some embodiments, objects of the 3D model are color-coded so that when a user selects a pixel in the original image, the corresponding pixel in the model image is used to identify the corresponding object.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing system for annotating imagery, the method comprising:
   accessing an original image along with metadata based on a view of a camera that collected the original image;
   rendering based on the metadata a model image of a 3D model of one or more objects within the original image;
   displaying to a user the original image;
   receiving from the user a selection of a point on the original image and an annotation;
   identifying, based on the corresponding point of the model image, the object of the 3D model to which the point corresponds; and
   associating the annotation with the identified object of the 3D model.

2. The method of claim 1 wherein the point is a pixel of the original image and the original image and the model image are aligned so that a pixel in the original image that corresponds to a location on an object and a corresponding pixel in the model image corresponds to the same location on the object of the 3D model.

3. The method of claim 2 wherein a pixel in the original image and a pixel in the model image correspond when they have a row number and column number that are the same.

4. The method of claim 2 wherein the objects of the 3D model are colored so that each object in the model image has a unique color and wherein the identifying of the object of the 3D model includes determining the color of the corresponding pixel of the model image and identifying the object based on the determined color.

5. The method of claim 2 further comprising adding to the 3D model an annotation identifier for each existing annotation so that the model image includes the annotation identifier of any existing annotation of an object of the 3D model that is in the model image.

6. The method of claim 2 further comprising generating metadata for each pixel of the model image that identifies the object of the 3D model to which the pixel corresponds.

7. The method of claim 6 wherein the metadata for a pixel includes an annotation identifier for the annotation associated with that pixel.

8. The method of claim 1 further comprising identifying a position on the object to which the point corresponds and wherein the associating of the annotation with the identified object includes storing a mapping of the position of the object to the annotation.

9. The method of claim 8 wherein the mapping further identifies the object of the 3D model.

10. The method of claim 1 further comprising:
    determining whether alignment of the model image with the original image satisfies an alignment criterion; and
    when the alignment does not satisfy the alignment criterion, applying a transform to align the model image with the original image.

11. The method of claim 10 wherein the alignment criterion is based on closeness of features of the model image to the corresponding features of the original image.

12. The method of claim 1 wherein the camera is on a satellite and the metadata for the original image includes metadata based on a rational polynomial coefficient model.

13. The method of claim 12 further comprising determining a latitude, longitude, and height to which a target pixel at a target row number and a target column number of the original image corresponds by assuming a height, determining a latitude and longitude that corresponds to the target pixel at the height, and iteratively: determining a surface height at the latitude and longitude, adjusting the height based on the surface height, and determining a new latitude and longitude that corresponds to the target pixel at the adjusted height until the latitude, longitude, and adjusted height converge on a solution.

14. The method of claim 13 wherein the surface height is determined from a digital elevation map.

15. A method performed by a computing system for presenting annotations of imagery, the method comprising:
    providing an association between an annotation and an annotated object of a 3D model;
    accessing an original image along with metadata based on a view of a camera that collected the original image, the original image including at least a portion of the annotated object;
    rendering based on the metadata a model image of the 3D model of one or more objects within the original image;
    identifying based on the rendered image a pixel in the original image that corresponds to the annotated object;
    adding an annotation indicator positioned by the identified pixel; and
    displaying the original image with the annotation indicator.

16. The method of claim 15 further comprising, in response to receiving from a user a selection of the annotation indicator, displaying the annotation.

17. The method of claim 15 wherein the original image and the model image are aligned so that a pixel in the original image that corresponds to a location on an object of the 3D model and a corresponding pixel in the model image correspond to the same location on the same object of the 3D model.

18. The method of claim 17 wherein a pixel in the original image and a pixel in the model image correspond when they have a row number and column number that are the same.

19. The method of claim 17 further comprising adding to the 3D model an annotation identifier for the annotation for identifying the annotation corresponding to the annotated object.

20. The method of claim 17 further comprising generating metadata for each pixel of the model image, the metadata indicating an object, if any, of the 3D model to which the pixel corresponds.

21. The method of claim 15 wherein the annotation is associated with a position on the annotated object.

22. One or more computing systems for annotating imagery, the one or more computing systems comprising:
one or more computer-readable storage mediums for storing computer-executable instructions for controlling the one or more computing systems to:
access an original image along with metadata based on a view of a camera that collected the original image;
render based on the metadata a model image of a 3D model of one or more objects within the original image;
display to a user the original image;
receive from the user a selection of a point on the original image and an annotation;
identify, based on the corresponding point of the model image, the object of the 3D model to which the point corresponds; and
associate the annotation with the identified object of the 3D model; and
one or more processors for executing the computer-executable instructions stored in the one or more computer-readable storage mediums.

23. The one or more computing systems of claim 22 wherein the point is a pixel of the original image and the original image and the model image are aligned so that a pixel in the original image that corresponds to a location on an object and a corresponding pixel in the model image corresponds to the same location on the object of the 3D model.

24. The one or more computing systems of claim 22 wherein the instructions further identify a position on the object to which the point corresponds and wherein the associating of the annotation with the identified object includes storing a mapping of the position of the object to the annotation.

25. The one or more computing systems of claim 22 wherein the instructions further:
determine whether alignment of the model image with the original image satisfies an alignment criterion; and
when the alignment does not satisfy the alignment criterion, apply a transform to align the model image with the original image.

26. The one or more computing systems of claim 22 wherein the camera is on a satellite and the metadata for the original image includes metadata based on a rational polynomial coefficient model.

27. One or more computing systems for presenting annotations of imagery, the one or more computing systems comprising:
one or more computer-readable storage mediums for storing computer-executable instructions for controlling the one or more computing systems to:
provide an association between an annotation and an annotated object of a 3D model;
access an original image along with metadata based on a view of a camera that collected the original image, the original image including at least a portion of the annotated object;
render based on the metadata a model image of the 3D model of one or more objects within the original image;
identify based on the rendered image a pixel in the original image that corresponds to the annotated object;
add an annotation indicator positioned by the identified pixel; and
display the original image with the annotation indicator; and
one or more processors for executing the computer-executable instructions stored in the one or more computer-readable storage mediums.

28. The one or more computing systems of claim 27 wherein the original image and the model image are aligned so that a pixel in the original image that corresponds to a location on an object of the 3D model and a corresponding pixel in the model image correspond to the same location on the same object of the 3D model.

29. The one or more computing systems of claim 27 wherein the annotation is associated with a position on the annotated object.

* * * * *